(12) United States Patent
Propheter-Hinckley

(10) Patent No.: US 11,242,768 B2
(45) Date of Patent: Feb. 8, 2022

(54) INVESTMENT CASTING CORE BUMPER FOR GAS TURBINE ENGINE ARTICLE

(71) Applicant: United Technologies Corporation, Farmington, CT (US)

(72) Inventor: Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 36 days.

(21) Appl. No.: 16/815,042

(22) Filed: Mar. 11, 2020

(65) Prior Publication Data

US 2021/0285336 A1 Sep. 16, 2021

(51) Int. Cl.
*F01D 25/12* (2006.01)
*F01D 25/14* (2006.01)
*F01D 25/24* (2006.01)

(52) U.S. Cl.
CPC ............ *F01D 25/12* (2013.01); *F01D 25/14* (2013.01); *F01D 25/24* (2013.01); *F05D 2250/18* (2013.01)

(58) Field of Classification Search
CPC .......... F01D 25/12; F01D 25/14; F01D 25/24; F01D 5/08; F01D 5/147; F01D 5/18; F01D 5/186; F01D 5/187; F05D 2250/18
See application file for complete search history.

(56) References Cited

U.S. PATENT DOCUMENTS

| 7,216,689 | B2 * | 5/2007 | Verner ...................... B22C 7/02 164/45 |
| 7,306,024 | B2 | 12/2007 | Beals et al. |
| 7,717,675 | B1 * | 5/2010 | Liang ...................... F01D 5/187 416/95 |
| 8,066,052 | B2 * | 11/2011 | Blair ...................... B22C 21/14 164/44 |
| 8,777,571 | B1 * | 7/2014 | Liang ...................... F01D 5/187 416/97 R |
| 10,024,190 | B1 | 7/2018 | Memmen |
| 10,323,525 | B2 * | 6/2019 | Spangler ................. F01D 5/187 |
| 2016/0376896 | A1 * | 12/2016 | Spangler ................. F01D 9/041 415/115 |
| 2017/0306764 | A1 * | 10/2017 | Konitzer ................. F01D 5/147 |
| 2018/0073368 | A1 * | 3/2018 | Howe ....................... B22C 9/10 |
| 2019/0091759 | A1 | 3/2019 | Propheter-Hinckley et al. |
| 2020/0149411 | A1 * | 5/2020 | Propheter-Hinckley ..... F01D 5/187 |

* cited by examiner

*Primary Examiner* — Igor Kershteyn
(74) *Attorney, Agent, or Firm* — Carlson, Gaskey & Olds, P.C.

(57) ABSTRACT

A gas turbine engine article includes an article wall that defines a cavity, a cooling passage network embedded between inner and outer portions of the article wall, and at least one conical passage through at least a portion of the inner portion of the article wall. The cooling passage network has an inlet orifice through the inner portion of the article wall to receive cooling air from the cavity, an outlet orifice through the outer portion of the article wall, and an intermediate region of passages that connects the inlet orifice to the outlet orifice. The conical passage has a first end that is proximate the cavity and a second end that opens at the intermediate region of passages.

19 Claims, 4 Drawing Sheets

INVESTMENT CASTING CORE BUMPER FOR GAS TURBINE ENGINE ARTICLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes an article wall that defines a cavity, and a cooling passage network embedded in the article wall between inner and outer portions of the article wall. The cooling passage network has an inlet orifice through the inner portion of the article wall to receive cooling air from the cavity, an outlet orifice through the outer portion of the article wall, and an intermediate region of passages connecting the inlet orifice to the outlet orifice. At least one conical passage through at least a portion of the inner portion of the article wall has a first end proximate the cavity and a second end that opens at the intermediate region of passages.

In a further embodiment of any of the foregoing embodiments, the first end has a cross-section shape that is circular, and the second end has a cross-section shape that is a truncated circle.

In a further embodiment of any of the foregoing embodiments, the at least one conical passage has a cone angle of 45 degrees or more.

In a further embodiment of any of the foregoing embodiments, the at least one conical passage has a cone angle of 60 degrees or less.

In a further embodiment of any of the foregoing embodiments, the intermediate region of passages includes a metering passage and a downstream diffusion passage, and the second end opens at the diffusion passage.

In a further embodiment of any of the foregoing embodiments, the at least one conical passage is non-overlapping with the outlet orifice.

In a further embodiment of any of the foregoing embodiments, the intermediate region of passages includes a set of passages arranged in parallel with respect to flow through the intermediate region of passages, and the second end opens to an inboard one of the set of passages arranged in parallel.

In a further embodiment of any of the foregoing embodiments, the intermediate region of passages includes a set of diffusion passages arranged in parallel with respect to flow through the intermediate region of passages, and the second end opens to an inboard one of the set of diffusion passages arranged in parallel.

In a further embodiment of any of the foregoing embodiments, the at least one conical passage includes at least two conical passages that are symmetrically arranged about a centerline of the intermediate region of passages.

In a further embodiment of any of the foregoing embodiments, the first end has a cross-section shape that is circular, the second end has a cross-section shape that is a truncated circle, the at least one conical passage has a cone angle of 45 degrees to 60 degrees, the intermediate region of passages includes a metering passage and a downstream diffusion passage, and the second end opens at the diffusion passage.

In a further embodiment of any of the foregoing embodiments, an investment casting core has a cooling passage network-forming section and a conical passage-forming bumper configured to, respectively, form the cooling passage network and the at least one conical passage.

A gas turbine engine according to an example of the present disclosure includes a compressor section, a combustor in fluid communication with the compressor section, and a turbine section in fluid communication with the combustor. The turbine section has a turbine engine article that includes an article wall that defines a cavity, and a cooling passage network embedded in the article wall between inner and outer portions of the article wall. The cooling passage network has an inlet orifice through the inner portion of the article wall to receive cooling air from the cavity, an outlet orifice through the outer portion of the article wall, and a region of intermediate passages connecting the inlet orifice to the outlet orifice. A conical passage through at least a portion of the inner portion of the article wall has one end proximate the cavity and another end that opens at the intermediate region of passages.

In a further embodiment of any of the foregoing embodiments, the first end has a cross-section shape that is circular, and the second end has a cross-section shape that is a truncated circle.

In a further embodiment of any of the foregoing embodiments, the at least one conical passage has a cone angle of 45 degrees to 60 degrees.

In a further embodiment of any of the foregoing embodiments, the intermediate region of passages includes a metering passage and a downstream diffusion passage, and the second end opens at the diffusion passage.

An investment casting core according to an example of the present disclosure includes a cooling passage network-forming section that has an inlet orifice-forming section, an outlet orifice-forming section, and an intermediate passages-forming section connecting the inlet orifice-forming section to the outlet orifice-forming section, and at least one conical passage-forming bumper projecting from the intermediate passages-forming section.

In a further embodiment of any of the foregoing embodiments, the at least one conical passage-forming bumper has a truncated base.

In a further embodiment of any of the foregoing embodiments, the at least one conical passage-forming bumper has a cone angle of 45 degrees or more.

In a further embodiment of any of the foregoing embodiments, the at least one conical passage-forming bumper has a cone angle of 60 degrees or less.

In a further embodiment of any of the foregoing embodiments, the at least one conical passage-forming bumper includes at least two conical passage-forming bumpers that are symmetrically arranged about a centerline of the intermediate passages-forming section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
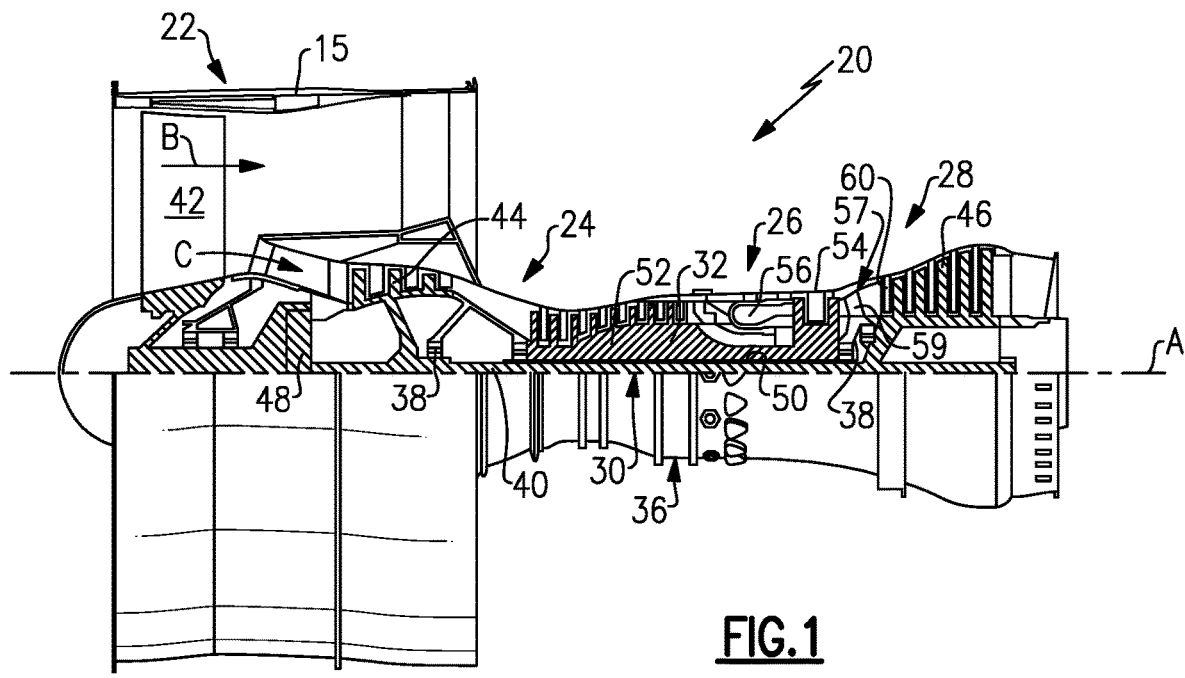
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Figure 2:
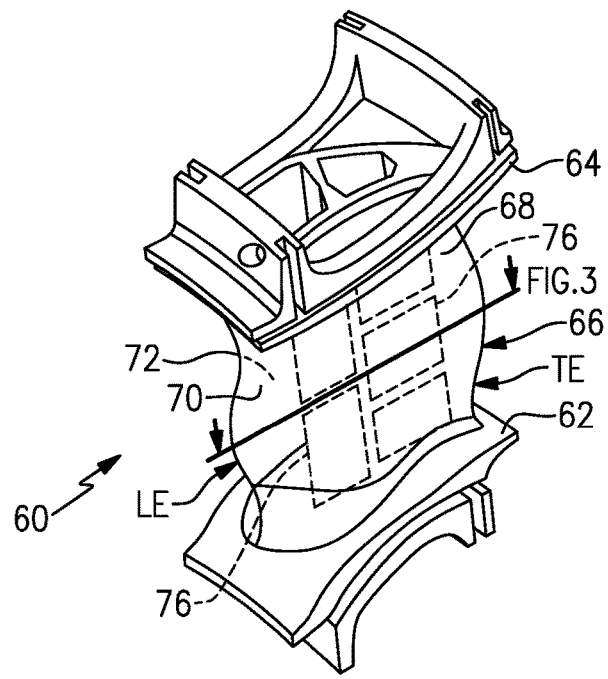
FIG. 2 illustrates an article of the gas turbine engine.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades, blade outer air seals, and combustor panels. The turbine airfoil 60 is also shown in a cross-sectioned view in FIG. 3.

Figure 3:
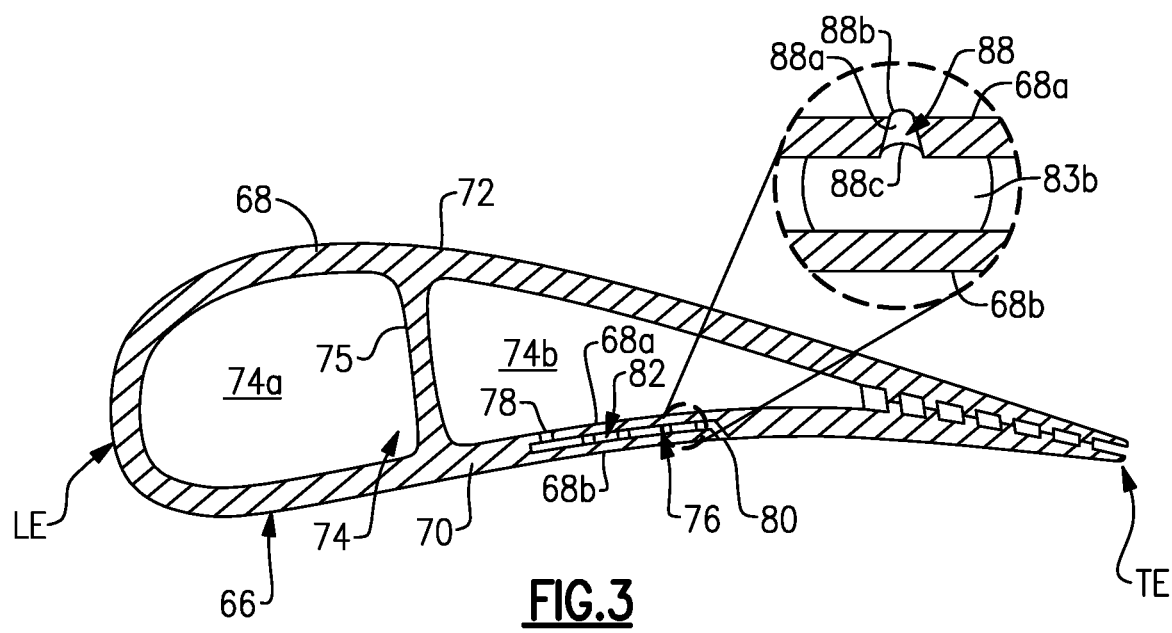
FIG. 3 illustrates a sectioned view of the article of FIG. 2.

Referring to FIGS. 2 and 3, the turbine airfoil 60 includes an inner platform 62, an outer platform 64, and an airfoil section 66 that spans between the inner and outer platforms 62/64. The airfoil section 66 includes an airfoil outer wall 68 that delimits the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

There is at least one cooling passage network 76 embedded in the airfoil outer wall 68 between inner and outer portions 68a/68b of the airfoil wall 68. For example, as shown (FIG. 3) one or more of the cooling passage networks 76 is embedded in the first side 70 of the outer wall 68, although one or more networks 76 could additionally or alternatively be embedded in the second side 72. The cooling passage networks 76 may also be referred to as mini-cores, mini-core passages, or skin-cores. The "-core" in these terms is a reference to the small investment casting core that is typically used to make such an embedded passage, as opposed to a main core that is used to form a main or central core cavity in an airfoil.

Figure 4:
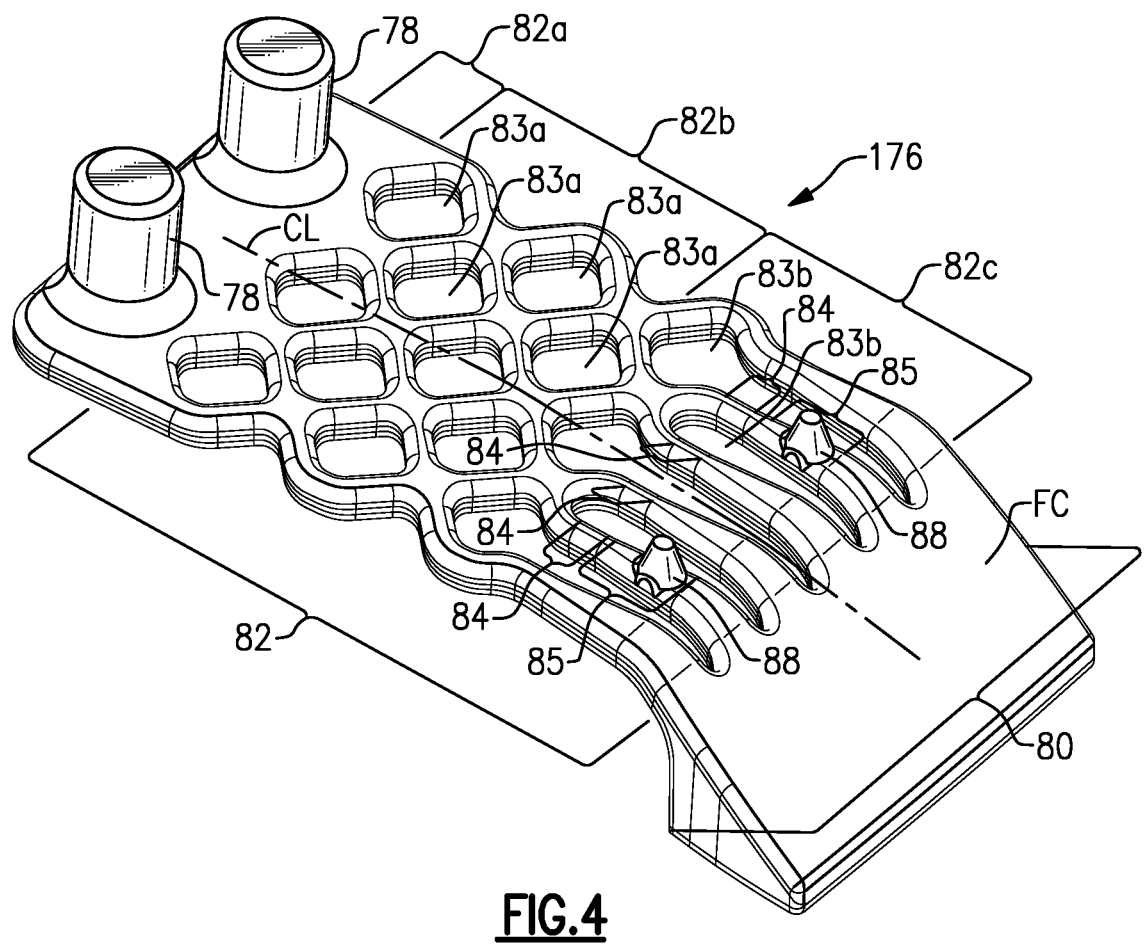
FIG. 4 illustrates an investment casting core that is configured to form a cooling passage network in a wall of the article in FIG. 2 and is also representative of the structure of the cooling passage network.

FIG. 4 shows an investment casting core 176 that is configured to form the cooling passage network 76 in an investment casting process. Investment casting process are generally known and thus not discussed further herein. The investment casting core 176 may be injection molded from a material that contains ceramic or metal alloy. The investment casting core 176 is an "inverse" or negative view of a representative one of the cooling passage networks 76. In the inverse view, solid structures of the investment casting core 176 produce void structures in the cooling passage network 76, and void structures of the investment casting core 176 produce solid structures in the cooling passage network 76. Appropriately, with the above understanding, the corresponding related features are numbered the same between the network 76 and the core 176, e.g., inlet orifice 78 in the network 76 is also labelled inlet orifice 78 in the core 176, and so on and so for the for the other sections of the network 76 and the core 176. It is to be further understood that the features in the core 176 are considered herein to be the forming structures for the corresponding features in the network 76, e.g., the inlet orifice 78 of the core 176 is the inlet orifice-forming section for the inlet orifice 78 in the network 76, and so on and so for the for the other sections of the core 176 and network 76.

The cooling passage network 76 includes at least one inlet orifice 78 through the inner portion 68a of the airfoil outer wall 68 (FIG. 3) to receive cooling air from the internal core cavity 74 and at least one outlet orifice 80 through the outer portion 68b of the airfoil outer wall 68 to discharge cooling air to the exterior of the airfoil 60 (i.e., into the core gas flow). In the illustrated example, the outlet orifice 80 is a single orifice that is radially elongated and generally rectangular, although other geometries may alternatively be used. An intermediate region of passages 82 connects the inlet orifice 78 to the outlet orifice 80. The inlet orifice 78 may be round and/or rectangular/racetrack and sized to achieve proper flow characteristics in the network 76. Most typically, the network 76 will include two inlet orifices 78. A single, exclusive inlet orifice 78 is also contemplated, as well as more than two inlet orifices 78, although fabrication may be more challenging.

The inlet orifices 78 open into the intermediate region of passages 82, which serve to distribute the cooling air and then discharge the air to the one or more outlet orifices 80. In this example, the intermediate region of passages 82 has several sub-sections, including a manifold section 82a, a sub-passage section 82b, and an exit section 82c. The manifold section 82a is generally open and permits the cooling air to turn and distribute evenly to the sub-passage section 82b.

In this example, the sub-passage section 82b includes an array of pedestals 83a. The pedestals 83a are arranged in rows that extend in the radial direction in the airfoil 60, which is perpendicular to the engine axis A. As shown, the rows are staggered and interleaved so as to define sub-passages there between. The size, shape, and pattern of the pedestals 83a and sub-passages may be selected based on the desired flow/pressure loss across the network 76 and heat transfer to the cooling air. The pedestals 83a as shown have a lobed-diamond cross-sectional geometry in which each of the faces of the diamond are concave such that the tips of the diamond form rounded projections, i.e., a lobes. It is to be understood, however, that the pedestals 83a may alternatively be, but are not limit to, diamond or other polygonal shape, round, oval, or elliptical.

The exit section 82c includes a plurality of flow guides 83b. For instance, the flow guides 83b have a teardrop shape and facilitate guiding and metering flow into the one or more outlet orifices 80. In this regard, the flow guides 83b in the illustrated example are shaped to form a set of metering passages 84 that are arranged in parallel with respect to flow through the intermediate region of passages 82. The metering passages 84 are flow-constriction regions of the passages between the flow guides 83b. For example, a flow-constriction region is the narrowest neck point or region of the passage, which serves to restrict flow and thus meter the flow Immediately downstream of each metering passage 84 there is a diffusion passage 85. The diffusion passage 85 diverges from the metering passage 84 such that the metered flow expands and reduces in velocity as it exits the metering passage 84.

During operation of the engine 20, cooling air, such as bleed air from the compressor section 24, is fed into the internal core cavity 74. The cooling air from the core cavity 74 flows into the cooling passage network 76 to cool the outer wall 68. The cooling air enters the cooling passage network 76 through the one or more inlet orifices 78 into the manifold section 82a. The cooling air then turns within the manifold section 82a and flows into and through the sub-passage section 82b, through the exit section 82c, and then out the one or more outlet orifices 80 to provide surface film cooling on the exterior surface of the airfoil section 66. In general, the cooling air thus flows in a downstream direction from the inlet orifices 78, through the intermediate region of passages 82, and then out the one or more outlet orifices 80.

In investment casting of airfoils and other gas turbine engine components, minicores are used to form cavities and passages. Such cores, however, must (i) be precisely positioned relative to one another in order to form the component walls with the proper thickness and (ii) be strong enough to withstand stresses induced in the casting process without breaking. A core may include a bumper, which is an integral projection that serves as a stand-off from an adjacent core to facilitate precise positioning between the cores. Although the purpose of such a bumper is to facilitate the casting process, its presence unavoidably leaves a vestige structure (i.e., a passage) in the component when molten metal fills in around the core and bumper. The vestige passage connects the cavities or passages formed by the adjacent cores, which can debit component performance Thus, if a bumper is made to be relatively large to achieve good strength, it may consequently produce a relatively large vestige passage that may further debit performance. Furthermore, a relatively large bumper has a large footprint on the core and may therefor also restrict where the bumper can be located on a core without interfering with other structures.

Together, the strength requirements and the location restrictions indicate that a bumper on the core 176 or similarly designed core should be located at the outlet orifice 80, as there is a relatively large, uniform area at face FC (FIG. 4) that can readily accommodate the footprint of a relatively large bumper. That location, however, would mean that the vestige passage formed by the bumper would align, or overlap in terms of line-of-sight, with the outlet orifice 80. The cooling air flowing through the vestige passage would thus jet through the outlet orifice and into the core gas flow at a steep angle, where it may (i) be lost into the core gas flow, (ii) increase the chances of detaching cooling film flow across the exterior surface of the airfoil 60, and/or (iii) provide little or no cooling in the network 76.

In this regard, the core 176 includes one or more bumpers 88 that are relatively large for strength, yet are engineered to have smaller than expected footprints so that they can be located in the intermediate region of passages 82, thereby avoiding the location at the outlet orifice 80 that may debit film cooling.

The core 176 in the illustrated example has two bumpers 88, although a single bumper 88 or additional bumpers 88 can in some instances be used. Most typically, the bumper or bumpers 88 are positioned with respect to the inlet orifice or orifices 78 to provide a well-balanced mechanical support when brought into contact with an adjacent core. As an example, the bumper or bumpers 88 may be symmetrically arranged about the centerline CL of the intermediate region of passages 82.

Figure 5A:
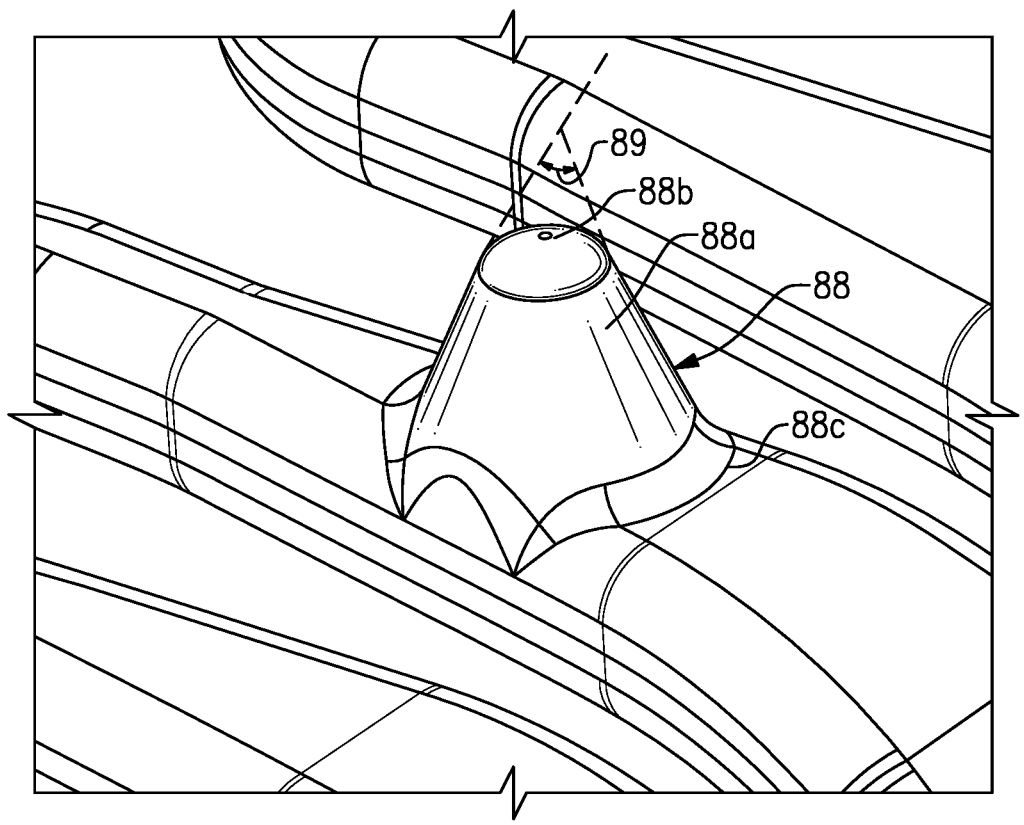
FIG. 5A is a view of a bumper of the investment casting core.
Figure 5B:
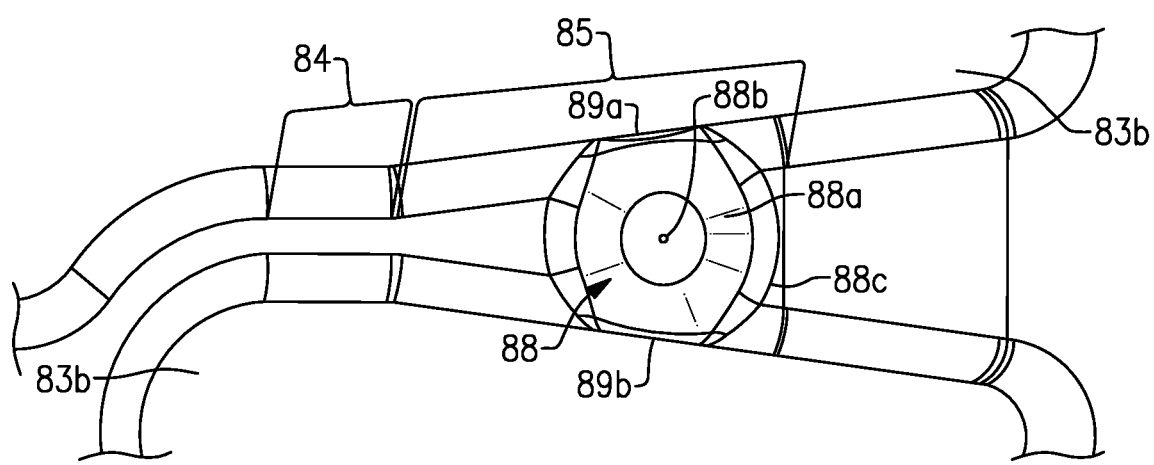
FIG. 5B is a top-down view onto the bumper of FIG. 5A.

Referring also to FIG. 5A that illustrates a closer view of the bumper 88 and FIG. 5B that illustrates a top-down view onto the bumper 88, the bumper 88 is has a conical shape that is delineated by a side 88a, a tip 88b, and a base 88c. In this example, the side 88a is a continuous sloped surface that is circular in cross-section and defines a cone angle 89. The cone angle is from 45 degrees to 60 degrees, which provides a sufficient size ratio between the tip 88b and base 88c to ensure good strength so that the bumper 88 does not break off. The side 88a may alternatively be faceted and still be considered conical, as long as the cone angle between the facet sides is as prescribed above.

In the illustrated example, the base 88c is generally circular about much of its cross-section. As will be appreciated, if the bumper 88 is instead faceted, the base 88c would be polygonal. As shown in FIG. 5B, the base 88c has opposed truncated sides 89a/89b such that the base 88c has the shape of a truncated circle. The circular shape of the base 88c thus ceases at the truncated sides 89a/89b, which blend into the walls of the adjacent flow guides 83b.

As the base 88c is truncated, its footprint on the core 176 is smaller in area as compared to the expected size of the base 88c if it were to be fully circular (or polygonal as the case may be). This reduced footprint permits the bumper 88 to be located in the intermediate region of passages 82, where there is generally less available area between the flow guides 83b or between the pedestals 83a to accommodate a bumper. Yet, the footprint is large enough to maintain good strength to resist breaking off. Most typically, the base 88c with truncated sides 89a/89b will have an area of 80% to 99% of the full area of the base 88c if it were to be continued without the truncated sides 89a/89b. In a further example, the base 88c has an area of 80% to 95% or 90%, for a smaller footprint.

As shown in the inset view in FIG. 3, the bumper 88 forms the corresponding conical passage 88 (i.e., vestige passage) in the inner portion 68a of the airfoil wall 68. Since the bumper 88 of the core 176 will abut the core that forms the cavity 74b, the passage 88 may in some instances connect the cavity 74b and the network 76, thereby creating a "leak path" by which cooling air can circumvent the inlet orifices 78 to enter the network 76. In other instances where molten metal flow around the bumper 88 during casting the passage 88 may not break through to the cavity 74b.

The passage 88 has a first end 88a that corresponds to the tip 88a and a second end 88c that corresponds to the base 88c. As will be appreciated, for a circular cross-section bumper 88, the first end 88a will be circular, and the second end 88c will have the shape of the truncated circle. If a leak path is created by the passage 88, it is relatively small and is optimally minimized to reduce leak flow. For example, the area of the first end 88a is less than 8% of the total area of the inlet orifices 78. More typically, the passage 88 will be even smaller in order to further reduce leak flow, such as less than 1% of the area of the total area of the inlet orifices 78.

The first end 88a may open at the cavity 74b, and the second end 88c opens at the intermediate region of passages 82. In the illustrated example, the second end 88c opens at the diffuser passage 85. Thus, if the passage 88 forms a leak path, the small amount of cooling air that bypasses the inlet orifices 78 and enters the network 76 via the passage 88 is fed into the diffuser passage 85, which is downstream of the metering passage 84. Because the cooling air from the passage 88 enters downstream of the metering passage 84, at the relatively low pressure region of the diffuser passage 85, the cooling air from the passage 88 does not significantly affect metering of the metering passage 84. Moreover, since the passage 88 is non-overlapping with the outlet orifice 80, jetting through the outlet orifice 80 avoided and the cooling air from the passage 88 can provide some cooling in the network prior to being discharged from the outlet orifice 80.

Figure 6:
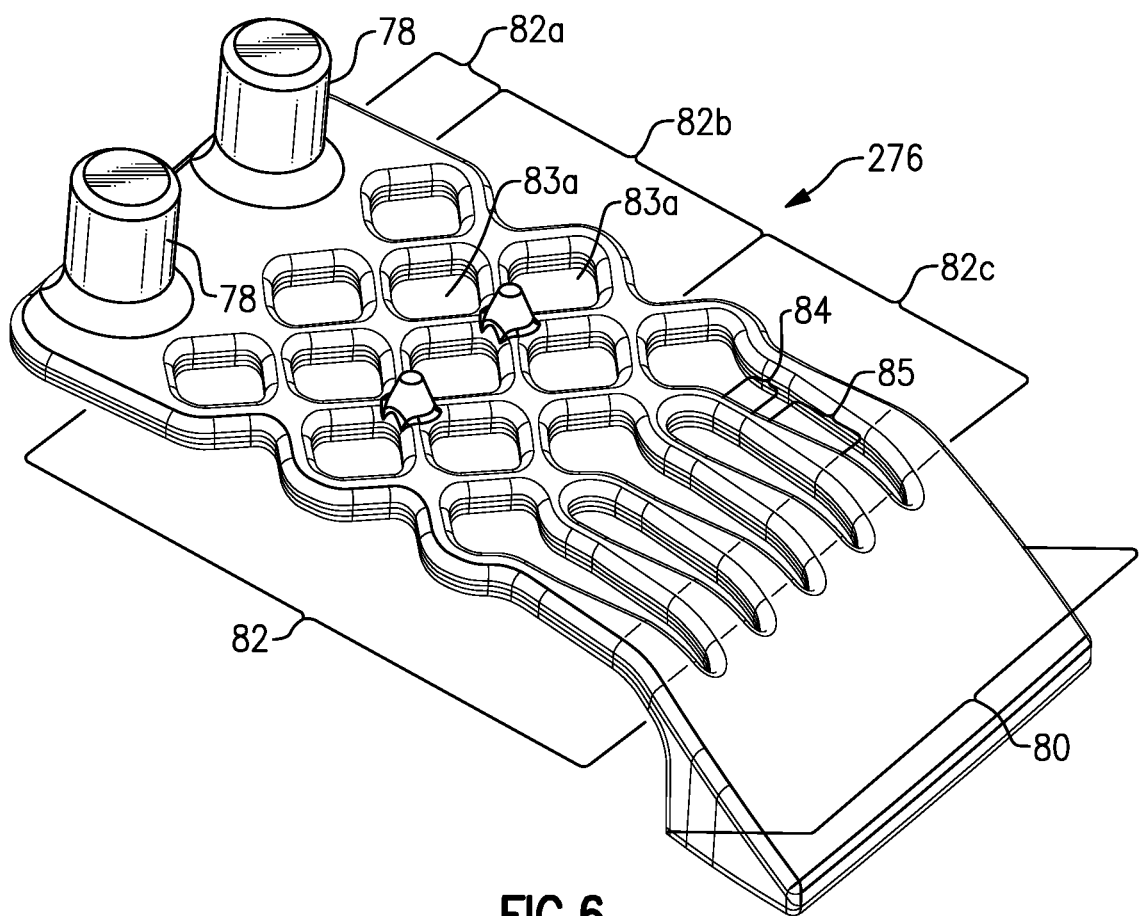
FIG. 6 illustrates another example of an investment casting core that has bumpers.

The location of the bumper 88 is not limited to the diffuser passage 85 or downstream location from the metering passage 84. For instance, FIG. 6 shows another investment casting core 276 that is identical to the core 176 except that the bumpers 88 are located in the sub-passage section 82b between adjacent pedestals 83a. Although this location also avoids jetting through the outlet orifice 80 and provide cooling in the network 76, since it is upstream of the metering passages 84 the cooling air added via the passage 88 may create a head-pressure before the metering passage 84 that could affect metering or even create a back-pressure through the network 76. This cooling air flow from the passage 88 may be accounted for to some extent in the design of the network 76, but doing so may sacrifice efficiency. Accordingly, this location for the bumper 88 can be viable but is somewhat less preferred than locations upstream of the metering passage 84 prior to the outlet orifice 80.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   an article wall defining a cavity;
   a cooling passage network embedded in the article wall between inner and outer portions of the article wall, the cooling passage network having an inlet orifice through the inner portion of the article wall to receive cooling air from the cavity, an outlet orifice through the outer portion of the article wall, and an intermediate region of passages connecting the inlet orifice to the outlet orifice; and
   at least one conical passage through at least a portion of the inner portion of the article wall, the at least one conical passage having a first end proximate the cavity and a second end that opens at the intermediate region of passages.

2. The gas turbine engine article as recited in claim 1, wherein the first end has a cross-section shape that is circular, and the second end has a cross-section shape that is a truncated circle.

3. The gas turbine engine article as recited in claim 1, wherein the at least one conical passage has a cone angle of 45 degrees or more.

4. The gas turbine engine article as recited in claim 3, wherein the at least one conical passage has a cone angle of 60 degrees or less.

5. The gas turbine engine article as recited in claim 1, wherein the intermediate region of passages includes a metering passage and a downstream diffusion passage, and the second end opens at the diffusion passage.

6. The gas turbine engine article as recited in claim 1, wherein the at least one conical passage is non-overlapping with the outlet orifice.

7. The gas turbine engine article as recited in claim 1, wherein the intermediate region of passages includes a set of passages arranged in parallel with respect to flow through the intermediate region of passages, and the second end opens to an inboard one of the set of passages arranged in parallel.

8. The gas turbine engine article as recited in claim 1, wherein the intermediate region of passages includes a set of diffusion passages arranged in parallel with respect to flow through the intermediate region of passages, and the second end opens to an inboard one of the set of diffusion passages arranged in parallel.

9. The gas turbine engine article as recited in claim 1, wherein the at least one conical passage includes at least two conical passages that are symmetrically arranged about a centerline of the intermediate region of passages.

10. The gas turbine engine article as recited in claim 1, wherein the first end has a cross-section shape that is circular, the second end has a cross-section shape that is a truncated circle, the at least one conical passage has a cone angle of 45 degrees to 60 degrees, the intermediate region of passages includes a metering passage and a downstream diffusion passage, and the second end opens at the diffusion passage.

11. An investment casting core having a cooling passage network-forming section and a conical passage-forming bumper configured to, respectively, form the cooling passage network and the at least one conical passage as recited in claim 1.

12. A gas turbine engine comprising:
    a compressor section;
    a combustor in fluid communication with the compressor section; and
    a turbine section in fluid communication with the combustor,
    the turbine section having a turbine engine article that includes
      an article wall defining a cavity,
      a cooling passage network embedded in the article wall between inner and outer portions of the article wall, the cooling passage network having an inlet orifice through the inner portion of the article wall to receive cooling air from the cavity, an outlet orifice through the outer portion of the article wall, and a region of intermediate passages connecting the inlet orifice to the outlet orifice, and
      a conical passage through at least a portion of the inner portion of the article wall, the conical passage having one end proximate the cavity and another end that opens at the intermediate region of passages.

13. The gas turbine engine as recited in claim 12, wherein the first end has a cross-section shape that is circular, and the second end has a cross-section shape that is a truncated circle.

14. The gas turbine engine as recited in claim 13, wherein the at least one conical passage has a cone angle of 45 degrees to 60 degrees.

15. The gas turbine engine as recited in claim 14, wherein the intermediate region of passages includes a metering passage and a downstream diffusion passage, and the second end opens at the diffusion passage.

16. An investment casting core comprising:
    a cooling passage network-forming section having an inlet orifice-forming section, an outlet orifice-forming section, and an intermediate passages-forming section connecting the inlet orifice-forming section to the outlet orifice-forming section; and
    at least one conical passage-forming bumper projecting from the intermediate passages-forming section, the at least one conical passage-forming bumper having a truncated base.

17. The investment casting core as recited in claim 16, wherein the at least one conical passage-forming bumper has a cone angle of 45 degrees or more.

18. The investment casting core as recited in claim 17, wherein the at least one conical passage-forming bumper has a cone angle of 60 degrees or less.

19. The investment casting core as recited in claim 16, wherein the at least one conical passage-forming bumper includes at least two conical passage-forming bumpers that are symmetrically arranged about a centerline of the intermediate passages-forming section.

* * * * *